UNITED STATES PATENT OFFICE.

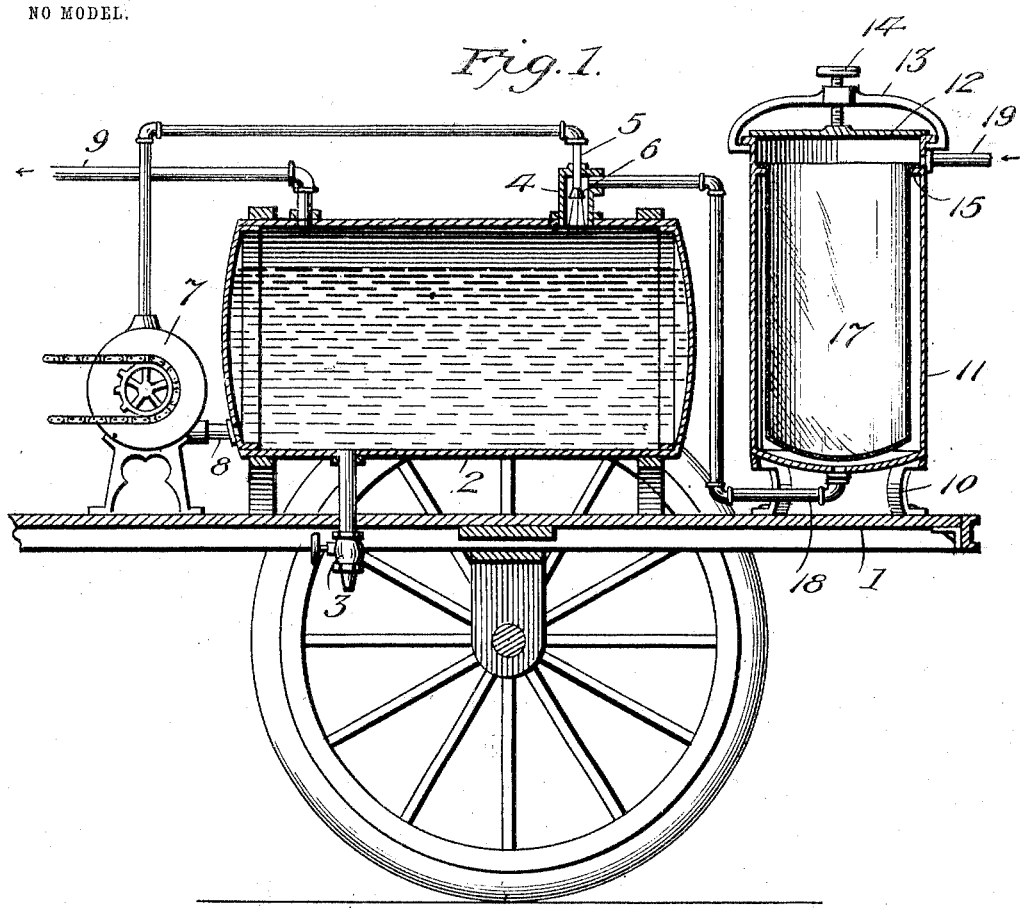
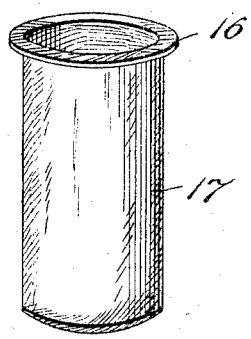
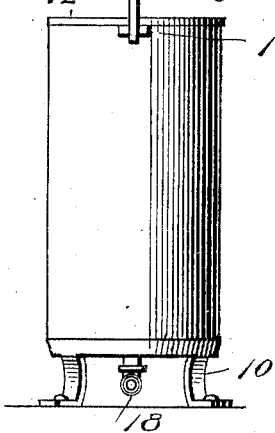
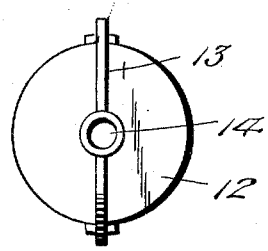

GEORGE CLEMENTS AND JAMES M. HOSTLER, OF CHICAGO, ILLINOIS.

HOUSE-CLEANING APPARATUS.

SPECIFICATION forming part of Letters Patent No. 777,002, dated December 6, 1904.

Application filed January 23, 1904. Serial No. 190,348. (No model.)

*To all whom it may concern:*

Be it known that we, GEORGE CLEMENTS and JAMES M. HOSTLER, citizens of the United States, residing at Chicago, in the county of Cook and State of Illinois, have invented new and useful Improvements in House-Cleaning Apparatus, of which the following is a specification.

Our invention relates to new and useful improvements in house-cleaning apparatus, and it is more especially an improvement upon the device described and claimed by us in United States Patent No. 751,380, dated February 2, 1904.

The object of the present device is to provide means whereby lint and other large particles drawn into the apparatus may be separated from the dust prior to its discharge into a receptacle provided therefor.

A further object is to provide a combined water-tank and dust-receptacle and to employ means whereby the water contained within the tank may be used for spraying the dust.

With the above and other objects in view the invention consists of a water-tank having an outlet connected to a pump, and said pump is adapted to force the water into a mixing-chamber arranged upon the receptacle and where a spraying device is provided.

The invention also consists of a receptacle having an inlet adapted to be connected to a hose and having an outlet connected with the mixing-chamber. Arranged within this receptacle is a receiver for collecting lint and other large particles drawn into the receptacle, but through which air and fine dust may freely pass.

The invention also consists in the further novel construction and combination of parts hereinafter more fully described and claimed, and illustrated in the accompanying drawings, showing the preferred form of our invention, and in which—

Figure 1 is a section through our improved apparatus. Fig. 2 is an elevation of the separator. Fig. 3 is a plan view thereof, and Fig. 4 is a detail view of the lint-receptacle.

Referring to the figures by numerals of reference, 1 is a platform, having a water-tank 2 arranged thereon and provided with a valved drain 3. A tubular extension 4 is formed upon the tank and forms a mixing-chamber, and projecting into the top of this chamber is a discharge-pipe 5, having a spraying device 6 at the end thereof. This discharge-pipe extends from a pump 7, located on the platform and adapted to receive water through a pipe 8 from the tank 2. Pump 7 is adapted to be driven by means of a suitable motor provided therefor, but not shown. A suction-pipe 9 extends from the top of the tank 1 and extends to a suction-pump. (Not shown.) Mounted on standards 10 on platform 1 is a receptacle 11, having a removable cap 12, which is held in place by a cross-bar 13, having a set-screw 14 therein. A flange 15 is formed within the receptacle and serves to support a ring 16, which is secured about the open end of a receiver 17, formed of a coarse fabric. This receiver is supported out of contact with the bottom of the receptacle 11, and extending from said bottom is an outlet-pipe 18, which opens into one side of the compartment 4. An inlet-pipe 19 opens into the receptacle 11 at a point above receiver 17 and is adapted to be connected to hose.

In operating the apparatus herein described the tank 2 is partly filled with water and the pump 7 is set in operation, so as to draw water through the pipe 8 and discharge it into the spraying device 6. A suction is then established through pipe 19, receptacle 11, pipe 18, compartment 4, tank 2, and pipe 9, and any suitable form of pump may be employed for producing this result. Hose (not shown) may be attached to the pipe 19 and carried to the place to be cleaned, and dust will be drawn in through the hose and pipe 19 and to the receiver 17. The finer particles will be carried through the receiver into pipe 18 and will be sprayed in compartment 4 and deposited in the water within the tank 2. The larger particles will collect within the receiver and can be subsequently removed. By providing this receiver clogging of the apparatus is prevented, and the same is rendered more effective than where all the dust, &c., is discharged directly into the tank 2. The receiver 17 can be removed by loosening and detaching the cross-bar 13 and then lifting the receiver from the flange 15. In this apparatus the water is used as long as desired not only for receiving the dust, but for spraying it, and it therefore becomes unnecessary to renew the supply of water except at long intervals. The tank can be readily cleaned by opening the drain-pipe 3.

In the foregoing description we have shown the preferred form of our invention; but we do not limit ourselves thereto, as we are aware that modifications may be made therein without departing from the spirit or sacrificing any of the advantages thereof, and we therefore reserve the right to make such changes as fairly fall within the scope of our invention.

Having thus fully described the invention, what is claimed as new is—

1. The combination with a water-tank having a compartment communicating therewith, and an inlet to the compartment; of a pump, an outlet from the tank to the pump, a discharge-pipe from the pump to the compartment, and a spraying device upon the discharge-pipe and within the compartment.

2. In an apparatus of the character described, the combination with a tank having a compartment communicating therewith, and a spraying device within the compartment; of means for directing water from the tank to the spraying device, a receptacle having an outlet communicating with the compartment and an inlet, and a receiver within the receptacle between the inlet and outlet.

In testimony whereof we affix our signatures in presence of two witnesses.

GEORGE CLEMENTS.
JAMES M. HOSTLER.

Witnesses:
RICHARD S. RYAN,
HENRY P. MORRISSEY.